July 7, 1959   J. E. ETTORRE   2,893,280
ANGULAR TURNING ATTACHMENT
Filed Dec. 19, 1955   2 Sheets-Sheet 1

INVENTOR.
JAMES E. ETTORRE
BY
ATTORNEY

July 7, 1959
J. E. ETTORRE
2,893,280
ANGULAR TURNING ATTACHMENT
Filed Dec. 19, 1955
2 Sheets-Sheet 2
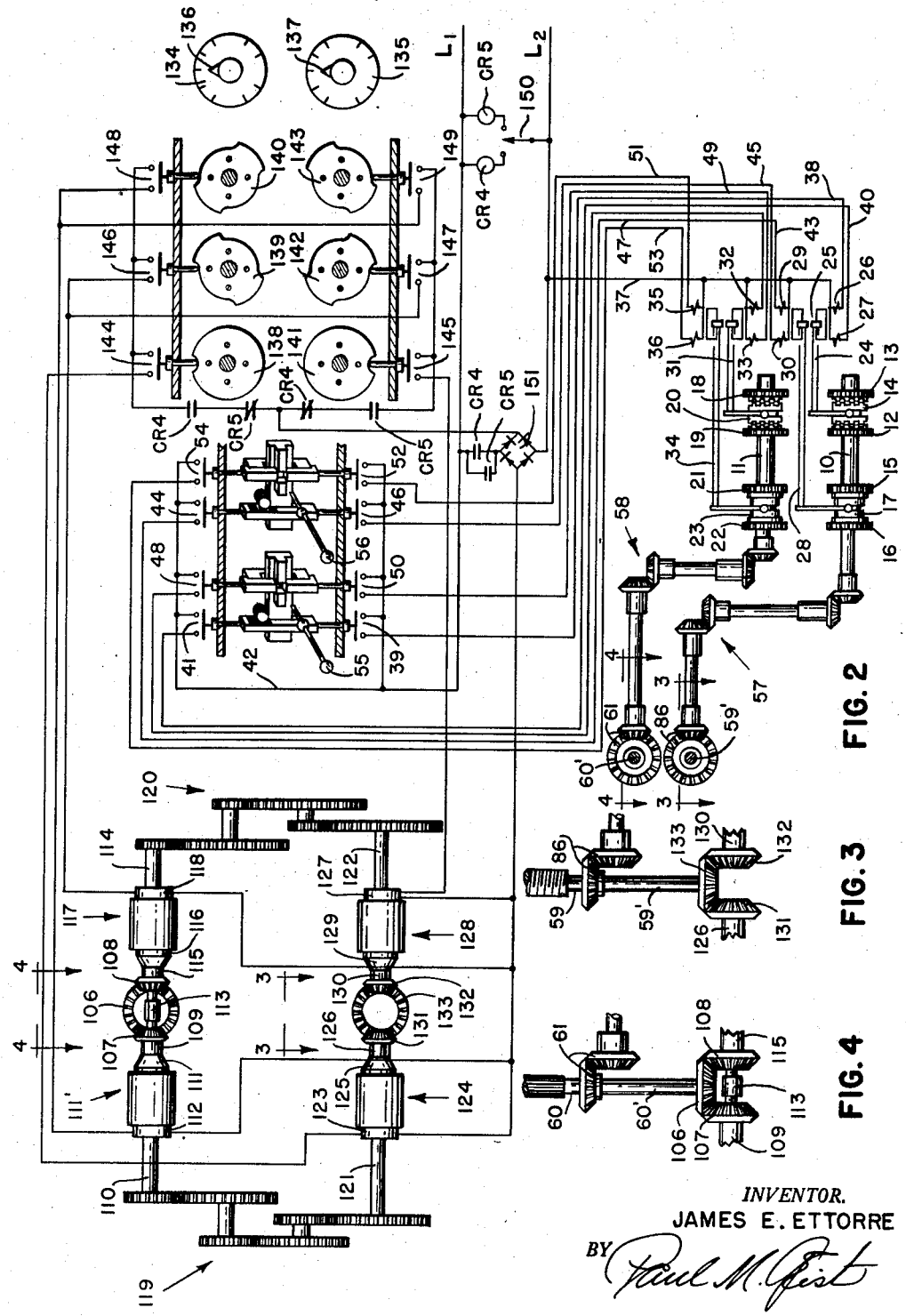
INVENTOR.
JAMES E. ETTORRE
ATTORNEY

United States Patent Office 2,893,280
Patented July 7, 1959

2,893,280

ANGULAR TURNING ATTACHMENT

James E. Ettorre, Bridgeport, Conn., assignor to The Bullard Company, a corporation of Connecticut Application December 19, 1955, Serial No. 553,896

16 Claims. (Cl. 82—2)

The present invention relates to machine tools and particularly to a new and improved angular turning attachment for lathes and the like.

The principal object of the present invention is to provide an attachment for a lathe or the like which will modify the combined rates of motion of the tool head along its intersecting paths in a manner to cause it to move along any desired angular path throughout 360°.

Other objects include the provision of such an attachment having automatically-selectable clutches to provide a desired angle of movement along which the tool head is adapted to be moved; the provision of such an attachment including a plurality of gear trains to produce separate angular movements, and in which reversible common means is employed for driving both gear trains simultaneously in the same direction; and the provision of such an attachment in which means is incorporated for selecting the train of gears necessary to produce the angle along which the tool head is desired to be moved.

The above, as well as other objects and novel features of the invention will become apparent from the following specification and the accompanying drawings, in which:

Fig. 2 is a modification of the apparatus shown in Fig. 1;

Fig. 3 is a view looking in the direction of the arrows along line 3—3 of Fig. 2; and Fig. 4 is a view looking in the direction of the arrows along line 4—4 of Fig. 2.

Figure 1:
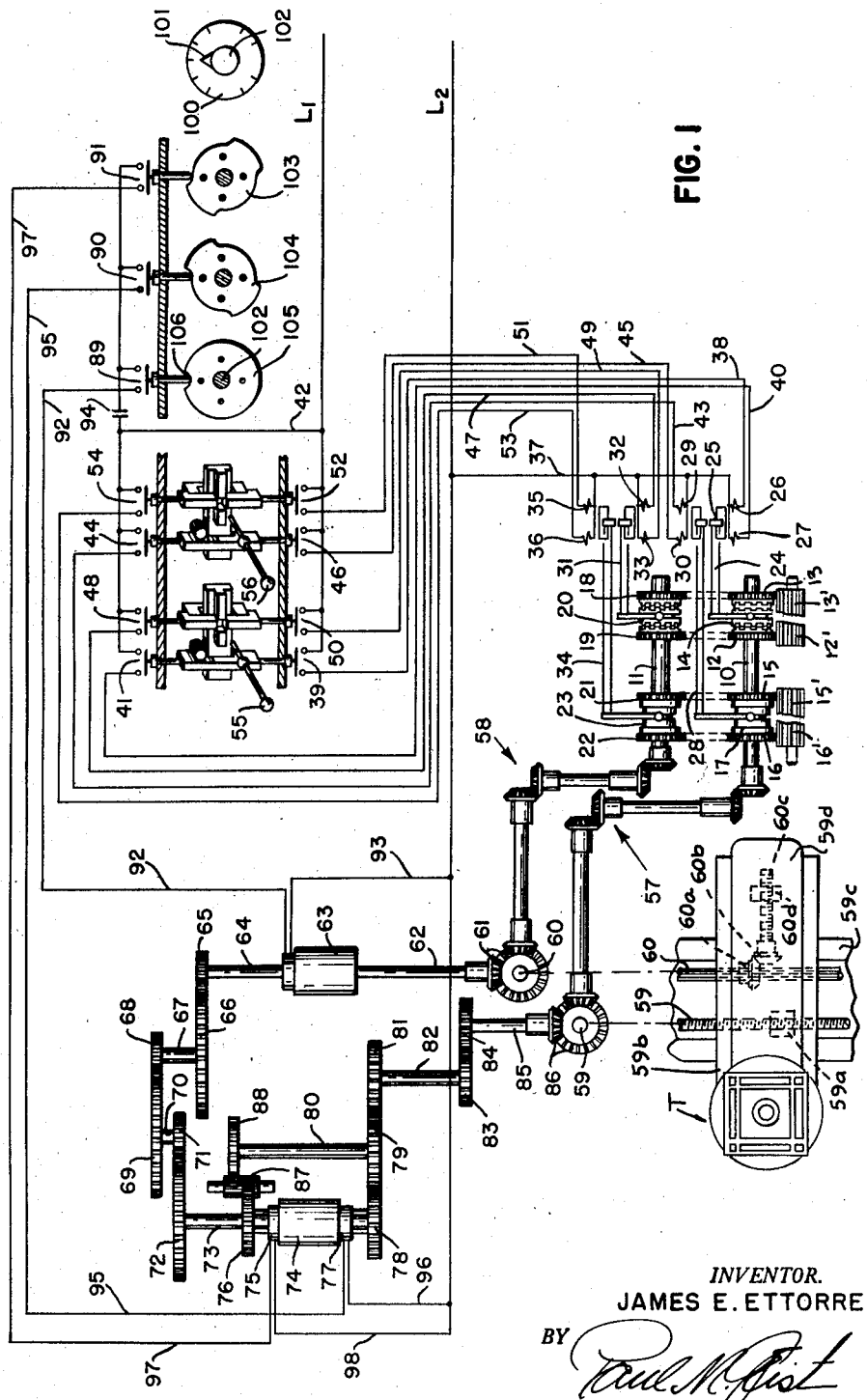
Figure 1 is a schematic representation of certain portions of a machine tool to which the principles of the invention have been applied.

The subject matter of the present invention is related to that shown, described and claimed in application Serial No. 386,166, filed October 15, 1953, in the name of E. C. Bullard et al. Only that portion of the Bullard et al. application is shown in this case necessary to an understanding of the principles of the present invention, and attention is directed to that application for details of construction not shown herein.

Referring to Fig. 1, a portion of the feedworks of the above-referred-to patent application comprises shafts 10 and 11. A pair of gears 12 and 13 are journaled on the shaft 10 and a positive-action clutch 14 is splined to the shaft 10 and located between the gears 12 and 13. Movement of the clutch element 14 leftwardly causes the gear 12 to drive the shaft 10, and movement of the clutch element 14 rightwardly causes the shaft 10 to be driven by the gear 13.

Another pair of gears 15 and 16 is journaled on the shaft 10, and a friction clutch 17 is splined to the shaft 10 between the gears 15 and 16. Movement of the clutch element 17 leftwardly causes the shaft 10 to be driven by the gear 16, while movement of the clutch 17 rightwardly causes the shaft 10 to be driven by the gear 15. The gears 12 and 13 are adapted reversely, relatively to each other, to be driven in both directions at any one of a plurality of speeds; while, the gears 15 and 16 are adapted reversely, relatively to each other, to be rotated in both directions by a relatively fast, constant speed drive as disclosed in the above-referred-to patent application. This is occasioned by employing overlapping intermeshing gears 12' and 13', respectively, meshing with gears 12 and 13. Also, overlapping intermeshing gears 15' and 16', respectively, intermesh with gears 15 and 16. The gear 13' is driven by a variable speed unit, while gear 16' is driven at a constant speed, all as more fully disclosed in the above-identified patent application.

The shaft 11 is provided with a pair of gears 18 and 19 journaled thereon, and a positive-action clutch 20 is splined to the shaft 11 between the gears 18 and 19. Leftward movement of clutch 20 causes the shaft 11 to be driven by the gear 19, whereas rightward movement of said clutch causes the shaft 11 to be driven by the gear 18.

The shaft 11 also journals a pair of gears 21 and 22, between which a friction clutch 23 is located and splined to the shaft 11. Leftward movement of the clutch 23 causes the shaft 11 to be driven by the gear 22, whereas movement of the clutch 23 rightwardly causes the shaft 11 to be rotated by the gear 21.

The gears 18 and 19 mesh with the gears 13 and 12, and the gears 21 and 22 mesh with the gears 15 and 16, respectively; however, for clarity they are shown in stretch out form. Accordingly, gears 13 and 18 rotate in a reverse direction relative to each other as do gears 12 and 19; however, gears 13 and 12 also rotate in a reverse direction relative to each other, as do gears 18 and 19. The same applies to the gears 15, 16, 21 and 22.

The clutch 14 is provided with a draw bar 24 that is adapted hydraulically to be moved leftwardly and rightwardly by a piston and cylinder mechanism that is controlled by a solenoid valve 25. Solenoid valve 25 is provided with two solenoid windings 26 and 27. Energization of the winding 26 causes the draw bar 24 to move rightwardly, whereas energization of the winding 27 causes the draw bar 24 to move leftwardly.

The clutch 17 is provided with a draw bar 28 that is controlled by the energization of solenoid windings 29 and 30 in the same manner as the draw bar 24 is controlled by the solenoid windings 26 and 27. The clutch 20 is provided with a draw bar 31 that is adapted to be moved rightwardly and leftwardly by solenoid windings 32 and 33; and, the clutch 23 is provided with a draw bar 34 that is adapted to be moved rightwardly and leftwardly by solenoid windings 35 and 36.

The one side of each of the solenoid windings 26, 27; 29, 30; 32, 33; 35, 36 is connected to a line 37 leading to L2. The other side of the winding 26 is connected to a conductor 38 that leads to one teminal of a switch 39, the other terminal of which is connected to line L1. The other side of the winding 27 is connected to a line 40 that leads to one terminal of a switch 41, the other terminal of which is connected to line L1 through a conductor 42. The other end of the winding 29 is connected to a line 43 that is connected to one terminal of a switch 44, the other terminal of which is connected to line L1 through the conductor 42.

The other end of the winding 30 is connected to a conductor 45 that is connected to one terminal of a switch 46, the opposite terminal of which is connected to the line L1. The other end of the winding 32 is connected to a conductor 47 that is in turn connected to the one terminal of a switch 48, the opposite terminal of which is connected to the line L1 through the conductor 42. The other end of the winding 33 is connected to a conductor 49 that leads to the one terminal of a switch 50, the opposite terminal of which is connected to the line L1. The other end of the winding 35 is connected to a conductor 51 that leads to the one terminal of a switch 52, the opposite terminal of which is connected to line L1. The other end of the winding 36 is connected to a conductor 53 that leads to the one terminal of a switch 54, the opposite terminal of which is connected to the line L1 through the conductor 42.

The switches 39, 41, 44, 46, 48, 50, 52 and 54 are adapted selectively to be actuated by a pair of pivotally mounted hand levers 55 and 56 in the same manner as the hand levers 311 and 312 of the above-referred-to Bullard et al. application are adapted to actuate the corresponding switches of that case.

The output shafts 10 and 11 are provided with shaft and bevel gear arrangements 57 and 58, respectively, that transmit the rotation of the shafts 10 and 11 to a threaded shaft 59 and a splined shaft 60, respectively. The screw 59 is threaded into a non-rotatable nut 59a that is mounted on a saddle 59b. The saddle 59b is slidingly mounted on a cross rail 59c of the lathe. Rotation of screw 59 in both directions causes reciprocation of the saddle 59b along the cross rail 59c. A slide 59d is mounted on the saddle 59b for reciprocative movement along a path at right angles to the path of movement of the saddle 59b. A bevel gear 60a is journaled in a cored out portion of the saddle 59b and it meshes with a bevel pinion 60b fixed to a screw 60c that is likewise journaled on the saddle 59b. The screw 60c is threaded into a non-rotatable nut 60d that is fixed to the slide 59d. A tool supporting turret T is mounted on the one end of the slide 59d and is adapted to support tools for movement relatively to a rotatable work support (not shown). In order to cause the tool head T to move along predetermined angular paths throughout 360°, it is necessary to vary the rotation of either the shaft 59 or 60 when they are simultaneously operated. In the present invention, this has been accomplished by providing a bevel gear arrangement 61 that connects the shaft 60 to a vertically disposed shaft 62. The shaft 62 is connected to one part of electro-magnetic clutch 63, the opposite portion of which is connected to a shaft 64. The shaft 64 is provided with a change gear 65 that is in mesh with another change gear 66. The change gear 66 is connected to a shaft 67 that has splined to it another change gear 68. Change gear 68 is adapted to mesh with another change gear 69 removably fixed to a shaft 70. Another change gear 71 is removably fixed to the shaft 70 and it meshes with an additional change gear 72 that is adapted to be splined to a vertically disposed shaft 73. The shaft 73 extends downwardly through a double magnetic clutch 74. The double magnetic clutch includes a portion 75 that is fixed to a gear 76 journaled on the shaft 73, and a portion 77 that is fixed to a gear 78 likewise journaled on the bottom end of the shaft 73. The central portion of the electric clutch 74 is fixed to the shaft 73 so that energization of the portion 75 will cause the gear 76 to be rotated by the shaft 73 and energization of the portion 77 will cause the gear 78 to be rotated by the shaft 73.

The gear 78 is in mesh with a gear 79 on a back shaft 80. The gear 79 meshes with a gear 81 fixed to a shaft 82. Another gear 83 fixed to the shaft 82 is in mesh with a gear 84 that is fixed to a shaft 85. Shaft 85 is connected to the threaded shaft 59 through a bevel pinion arrangement 86.

The gear 76, fixed to the clutch portion 75, is in mesh with a reversing pinion 87 which in turn meshes with a gear 88 fixed to the shaft 80. Accordingly, the gears 76 and 78 effect reverse rotation of the threaded shaft 59.

In order to energize the electro-magnetic clutches 63, 75 and 77 in the proper order, three switches 89, 90, 91 are provided. The one terminal of switch 89 is connected through a conductor 92 to the one terminal of the magnetic clutch 63, the opposite terminal of which is connected to the line L2 through a conductor 93. The opposite pole of the switch 89 is connected to the line L1 through the conductor 42. A normally open switch 94 is provided between the switch 89 and the conductor 42, and this switch is adapted to be closed when it is desired to render the angular turning attachment effective. The one terminal of the switch 90 is connected through a conductor 95 to the one terminal of the electro-magnetic clutch 77, the opposite terminal of which is connected to the line L2 through a conductor 96. The opposite contact of the switch 90 is connected to the line L1 through the conductor 42. The one terminal of the switch 91 is connected through a conductor 97 to the one side of the electro-magnetic clutch 75, the other side of which is connected to the conductor L2 through a conductor 98. The opposite contact of the switch 91 is connected to the line L1 through the conductor 42.

Closing the switch 89 causes the energization of the electro-magnetic clutch 63; closing the switch 90 causes the energization of the electro-magnetic clutch 77; and, closing the switch 91 energizes the electro-magnetic clutch 75.

In order to cause the spline 60 and the screw 59 to move the tool head along a predetermined path of travel angularly related to the horizontal and vertical, it is necessary to provide appropriate change gears 65, 66, 68, 69, 71 and 72. A separate series of such gears are employed for each half-degree of angular movement of the tool head; and, these series of change gears repeat for each 45° of the 360° of movement of the tool head.

The following table of change gears 65, 66, 68, 69, 71 and 72 comprises one set for providing the desired result. This table gives the number of teeth for each of the change gears to effect the movement of the tool head along a given path throughout 360°. There are two horizontally arranged rows of change gears 65, 66, 68, 69, 71 and 72. The upper row is employed when the desired path lies within the quadrants defined by the limits of 1:30 to 4:30 and 7:30 to 10:30. The lower row of change gears is employed when the desired angular path lies within the quadrants defined by the limits of 10:30 to 1:30 and 4:30 to 7:30.

| Angle | Tangent | Change Gears | | | | | |
|---|---|---|---|---|---|---|---|
| | | 72 / 65 | 71 / 66 | 69 / 68 | 68 / 69 | 66 / 71 | 65 / 72 |
| | | Change Gear Teeth | | | | | |
| 0°55′ | .01608 | 18 | 70 | 18 | 74 | 18 | 70 |
| 1°00′ | .01745 | 18 | 70 | 19 | 72 | 18 | 70 |
| 1°30′ | .02603 | 19 | 69 | 25 | 68 | 18 | 70 |
| 2°00′ | .03485 | 19 | 69 | 32 | 65 | 18 | 70 |
| 2°30′ | .04358 | 20 | 68 | 34 | 59 | 18 | 70 |
| 3°00′ | .05225 | 20 | 68 | 38 | 55 | 18 | 70 |
| 3°30′ | .06109 | 19 | 69 | 44 | 51 | 18 | 70 |
| 4°00′ | .06997 | 22 | 66 | 40 | 49 | 18 | 70 |
| 4°30′ | .07867 | 20 | 68 | 50 | 48 | 18 | 70 |
| 5°00′ | .08739 | 20 | 68 | 52 | 45 | 18 | 70 |
| 5°30′ | .09642 | 44 | 44 | 24 | 64 | 18 | 70 |
| 6°00′ | .10503 | 44 | 44 | 29 | 71 | 18 | 70 |
| 6°30′ | .11381 | 44 | 44 | 27 | 61 | 18 | 70 |
| 7°00′ | .12267 | 44 | 44 | 31 | 65 | 18 | 70 |
| 7°30′ | .13150 | 43 | 45 | 38 | 71 | 18 | 70 |
| 8°00′ | .14040 | 43 | 45 | 36 | 63 | 18 | 70 |
| 8°30′ | .14931 | 44 | 44 | 36 | 62 | 18 | 70 |
| 9°00′ | .15824 | 44 | 44 | 40 | 65 | 18 | 70 |
| 9°30′ | .16753 | 43 | 45 | 45 | 66 | 18 | 70 |
| 10°00′ | .17623 | 44 | 44 | 37 | 54 | 18 | 70 |
| 10°30′ | .18535 | 42 | 46 | 45 | 57 | 18 | 70 |
| 11°00′ | .19419 | 43 | 45 | 49 | 62 | 18 | 70 |
| 11°30′ | .20322 | 44 | 44 | 49 | 62 | 18 | 70 |
| 12°00′ | .21263 | 42 | 46 | 48 | 53 | 18 | 70 |
| 12°30′ | .22163 | 43 | 45 | 46 | 51 | 18 | 70 |
| 13°00′ | .23085 | 43 | 45 | 47 | 50 | 18 | 70 |
| 13°30′ | .24037 | 44 | 44 | 43 | 46 | 18 | 70 |
| 14°00′ | .24927 | 40 | 48 | 57 | 49 | 18 | 70 |
| 14°30′ | .25867 | 47 | 41 | 43 | 49 | 18 | 70 |
| 15°00′ | .26785 | 44 | 44 | 50 | 48 | 18 | 70 |
| 15°30′ | .27731 | 44 | 44 | 55 | 51 | 18 | 70 |
| 16°00′ | .28666 | 43 | 45 | 56 | 48 | 18 | 70 |
| 16°30′ | .29601 | 45 | 43 | 55 | 50 | 18 | 70 |
| 17°00′ | .30569 | 47 | 41 | 56 | 54 | 18 | 70 |
| 17°30′ | .31500 | 44 | 44 | 49 | 40 | 18 | 70 |
| 18°00′ | .32467 | 41 | 47 | 55 | 38 | 18 | 70 |
| 18°30′ | .33449 | 40 | 48 | 64 | 41 | 18 | 70 |
| 19°00′ | .34445 | 48 | 40 | 48 | 43 | 18 | 70 |
| 19°30′ | .35428 | 44 | 44 | 62 | 45 | 18 | 70 |
| 20°00′ | .36376 | 47 | 41 | 58 | 47 | 18 | 70 |

| Angle | Tangent | Change Gears ||||||
|---|---|---|---|---|---|---|---|
| | | 72/65 | 71/66 | 69/68 | 68/69 | 66/71 | 65/72 |
| | | Change Gear Teeth ||||||
| 20°30′ | .37377 | 27 | 61 | 38 | 45 | 44 | 44 |
| 21°00′ | .38368 | 34 | 54 | 39 | 64 | 44 | 44 |
| 21°30′ | .39407 | 28 | 60 | 38 | 45 | 44 | 44 |
| 22°00′ | .40413 | 27 | 61 | 42 | 46 | 44 | 44 |
| 22°30′ | .41438 | 27 | 61 | 44 | 47 | 44 | 44 |
| 23°00′ | .42456 | 27 | 61 | 47 | 49 | 44 | 44 |
| 23°30′ | .43484 | 28 | 60 | 41 | 44 | 44 | 44 |
| 24°00′ | .44545 | 28 | 60 | 42 | 44 | 44 | 44 |
| 24°30′ | .45588 | 44 | 44 | 31 | 68 | 44 | 44 |
| 25°00′ | .46666 | 44 | 44 | 28 | 60 | 44 | 44 |
| 25°30′ | .47703 | 28 | 60 | 46 | 45 | 44 | 44 |
| 26°00′ | .48787 | 28 | 60 | 46 | 44 | 44 | 44 |
| 26°30′ | .49848 | 28 | 60 | 47 | 44 | 44 | 44 |
| 27°00′ | .50493 | 44 | 44 | 27 | 53 | 44 | 44 |
| 27°30′ | .52083 | 44 | 44 | 25 | 48 | 44 | 44 |
| 28°00′ | .53177 | 31 | 57 | 44 | 45 | 44 | 44 |
| 28°30′ | .54310 | 30 | 58 | 42 | 40 | 44 | 44 |
| 29°00′ | .55452 | 30 | 58 | 46 | 41 | 43 | 45 |
| 29°30′ | .56561 | 31 | 57 | 52 | 50 | 44 | 44 |
| 30°00′ | .57715 | 31 | 57 | 52 | 49 | 44 | 44 |
| 30°30′ | .58921 | 31 | 57 | 52 | 48 | 44 | 44 |
| 31°00′ | .60073 | 32 | 56 | 41 | 39 | 44 | 44 |
| 31°31′ | .61261 | 34 | 54 | 36 | 37 | 44 | 44 |
| 32°00′ | .62500 | 44 | 44 | 30 | 48 | 44 | 44 |
| 32°31′ | .63708 | 31 | 57 | 41 | 35 | 44 | 44 |
| 33°00′ | .64912 | 44 | 44 | 37 | 57 | 44 | 44 |
| 33°30′ | .66191 | 34 | 54 | 41 | 39 | 44 | 44 |
| 34°00′ | .67461 | 34 | 54 | 45 | 42 | 44 | 44 |
| 34°30′ | .68750 | 44 | 44 | 33 | 48 | 44 | 44 |
| 35°00′ | .70000 | 32 | 56 | 49 | 40 | 44 | 44 |
| 35°30′ | .71317 | 34 | 54 | 43 | 38 | 44 | 44 |
| 36°00′ | .72649 | 34 | 54 | 45 | 39 | 44 | 44 |
| 36°30′ | .74000 | 44 | 44 | 37 | 50 | 44 | 44 |
| 37°00′ | .75338 | 41 | 47 | 38 | 44 | 44 | 44 |
| 37°30′ | .76743 | 44 | 44 | 33 | 43 | 44 | 44 |
| 38°00′ | .78181 | 44 | 44 | 55 | 43 | 44 | 44 |
| 38°30′ | .79532 | 34 | 54 | 48 | 38 | 44 | 44 |
| 39°00′ | .80952 | 34 | 54 | 45 | 35 | 44 | 44 |
| 39°30′ | .82451 | 34 | 54 | 55 | 42 | 44 | 44 |
| 40°00′ | .83916 | 38 | 50 | 53 | 48 | 44 | 44 |
| 40°30′ | .85416 | 41 | 47 | 47 | 48 | 44 | 44 |
| 41°00′ | .86956 | 40 | 48 | 48 | 46 | 44 | 44 |
| 41°30′ | .88461 | 44 | 44 | 46 | 52 | 44 | 44 |
| 42°00′ | .90064 | 39 | 49 | 43 | 38 | 44 | 44 |
| 42°30′ | .91666 | 44 | 44 | 44 | 48 | 44 | 44 |
| 43°00′ | .93247 | 42 | 46 | 48 | 47 | 44 | 44 |
| 43°30′ | .94884 | 42 | 46 | 53 | 51 | 44 | 44 |
| 44°00′ | .96526 | 39 | 49 | 57 | 47 | 44 | 44 |
| 44°30′ | .98214 | 44 | 44 | 55 | 56 | 44 | 44 |
| 45°00′ | 1.00000 | 44 | 44 | 44 | 44 | 44 | 44 |

In order to close the proper switches 90 and 91 for the proper angular path, a dial 100 is provided. A pointer 101 is fixed to a rotatable shaft 102 that extends through three cams 103, 104 and 105. The cam 105 has a single recess 106 therein so that any angular movement of the cam 105 beyond the position shown in Fig. 1 causes closing of the switch 89 and the consequent energization of the clutch 63. The cams 103 and 104 include switch closing portions arranged at different angular positions relatively to each other for a purpose to be described later. The pointer 101 is adapted to be moved to two different indices within each 90° portion of its 360° of rotation. Moving the pointer 101 counter-clockwise to its first position, causes one of the cam rises on the cam 104 to close the switch 90. The cam 105, of course, closes the switch 89, and the switch 91 remains open. Accordingly, electro-magnetic clutches 63 and 77 are energized. With a predetermined set of change gears from the above table applied to the shafts 64, 67, 70 and 73, the apparatus is conditioned to move the tool head along an angular path corresponding to said change gears as measured counter-clockwise from the zero position shown in Fig. 1. In the illustration above given, it is obvious that the vertical component of movement is greater than the horizontal component of movement for those angles of small degree, and less than, say, 22°30′. Accordingly, to most efficiently cause the head to move along the desired angle in this section, the feed or traverse levers 55 or 56 are moved vertically upwardly. Moving the lever 55 vertically upwardly causes the switch 50 to be closed, thereby energizing the solenoid 33 and causing the clutch 20 to become engaged with the gear 19. This causes the rotation of the spline 60 to move the tool head upwardly. The clutch 63 being energized drives the gear train including gears 65, 66, 68, 69, 71 and 72 and shaft 73 through the clutch mechanism 74. Since the electro-magnetic portion 77 of the clutch 74 is energized, the drive continues through gears 78, 79 and 81 to the gears 83, 84 and the screw 59, thereby causing the tool head to move horizontally simultaneously with its vertical movement, but in accordance with the predetermined set of change gears employed. The resultant movement of the tool head, therefore, is to follow along an angular path in accordance with the preselected change gears as indicated by the above table.

Movement of the pointer 101 to its second position counter-clockwise from the position shown in Fig. 1, causes the cams 103, 104 and 105 to function in the same manner as they functioned when the pointer 101 was at the first position above-described. The only significance of the pointer 101 being in this second position is to indicate that any selection of change gears employed will cause the tool head to move along an angular path within the second 45° section of the 360° of motion of the tool head, but only if the feed or traverse hand levers 55 and 56 are moved leftwardly instead of vertically upwardly as previously described. Movement of the hand lever 55 leftwardly causes the switch 39 to be closed, thereby energizing the solenoid 26 and effecting the engagement of the clutch 14 with the gear 13, thereby causing the screw 59 to be rotated in a manner to cause the tool head to move leftwardly. Simultaneously with the movement of the tool head leftwardly by the rotation of the screw 59, a drive is established from the screw 59 to the gears 84, 83, 81, 79, 78, the energized electro-magnetic clutch 77, the gears 72, 71, 69, 68, 66, 65, thence through the energized electro-magnetic clutch 63 to effect the driving of the spline 60 in a manner to cause the tool head to move vertically upwardly at a rate determined by the above-referred-to selected change speed gears to effect movement of the tool head along the corresponding angular path.

Movement of the pointer 101 to its third position counter-clockwise about the dial 100 (approximately 22½° of the second 90° portion of the rotative movement of the pointer 101), causes the cam 103 to close switch 91, effects the opening of the switch 90, and, of course, the switch 89 remains closed. In this condition, the portion 75 of the electro-magnetic clutch 74 is energized, while the portion 77 is de-energized, and the electro-magnetic clutch 63 remains energized. With a given selection of change gears from the above table, the tool head is adapted to be moved along the corresponding angular path when the levers 55 or 56 are moved leftwardly as previously described. In this connection, however, since the portion 75 is energized and the portion 74 of the clutch 77 is de-energized, the rotation of the screw 59 is reversed to that when the portion 75 was energized and the portion 77 de-energized. Likewise, when the pointer 101 is moved to its fourth position counter-clockwise from the initial position shown in Fig. 1, the same condition of the cams 103, 104 and 105 exists; however, in order to get the appropriate angular movement of the head, the levers 55 and 56 must be moved vertically downwardly.

Referring to Figs. 2, 3 and 4, the principles of the invention are shown as applied to the transmission and control therefor as shown in Fig. 1 except that an arrangement is provided for a plurality of separate paths of motion of the tool head which can be pre-set and selectively employed at the will of the operator. The splined shaft 60 is coupled to a coaxial shaft 60′ to the latter of which is fixed a bevel pinion 106 (Fig. 4) that meshes with two bevel pinions 107 and 108 respectively. The pinion 107 is fixed to a sleeve member 109 (Fig. 2) journaled on a shaft 110. The sleeve 109 is fixed to one rotating element 111 of the electro-magnetic clutch 111', whereas the other element 112 thereof is fixed to the shaft 110. The shaft 110 is connected to a connector 113 which latter is connected to a shaft 114 for a purpose to be described later. The bevel pinion 108 is integral with a sleeve 115 journaled on the shaft 114 and connected to one element 116 (Fig. 2) of an electro-magnetic clutch 117, the other rotating part 118 of which is connected to the shaft 114. Accordingly, energization of the electro-magnetic clutch 111' causes the shaft 110 as well as the shaft 114 to be rotated in one direction, whereas energization of the electro-magnetic clutch 117 causes the shafts 114 and 110 to be rotated in the reverse direction. Duplicate sets of change gears 119 and 120 identical with those disclosed in Fig. 1 connect the shafts 110 and 114, respectively, to shafts 121 and 122. The shaft 121 is fixed to one rotating part 123 of an electro-magnetic clutch 124, whereas the other rotating part 125 of the electro-magnetic clutch 124 is fixed to a shaft 126. Shaft 122 is connected to one rotating part 127 of an electro-magnetic clutch 128, the other rotating part 129 thereof is connected to a shaft 130. The shafts 126 and 130 are provided with bevel pinions 131 and 132 that mesh with a bevel pinion 133 fixed to coaxial shaft 59' that is coupled to bevel pinion 86 on the screw 59. Accordingly, depending upon whether the clutch 124 or 128 is energized, determines whether the screw 59 is rotated under the influence of the change-gear train 119 or 120.

Two dials 134 and 135 identical with the dial 100 of Fig. 1 are provided for the embodiment shown in Fig. 2. Pointers 136 and 137 are provided with the dials 134 and 135 and they are connected to shafts extending through cams 138, 139 and 140 on the one hand, and through cams 141, 142 and 143 on the other hand. The cams 138 and 141 maintain switches 144 and 145 closed at all times except at the zero position of the pointers 136 and 137, respectively. The cams 139 and 142 function substantially identically with the cam 104 and the cams 140 and 143 function substantially identically with the cam 103 of Fig. 1. The cams 139 and 142 are adapted to effect the closing of switches 146 and 147, respectively, in the same manner as the cam 104 closes the switch 90 of Fig. 1. The cams 140 and 143 are adapted to close the switches 148 and 149 in the same manner as the cam 103 closes the switch 91 of Fig. 1.

The pointers 136 and 137 function similarly to the pointer 101 of Fig. 1, and each is adapted to be operated independently of the other. However, in order to render the cams associated with the pointer 136 effective and to render the cams associated with the pointer 137 ineffective, a switch 150 is provided in convenient access to the operator which is adapted to energize relay CR4 or relay CR5. Energization of the relay CR4 causes the closing of the normally open CR4 switches, thereby rendering the switches 144, 146 and 148 effective, through the rectifier 151. Movement of the switch 150 rightwardly effects the energization of the relay CR5 thereby closing the normally open CR5 switches and rendering effective the switches 145, 147 and 149.

Since clutch 124 rotates the screw 59 oppositely to that of the clutch 128, the cams 142 and 143 must be arranged as shown in order to provide the correct angular path of movement of the tool head.

One of the advantages of the apparatus shown in Fig. 2 over that shown in Fig. 1 is the fact that two independent angular arrangements can be pre-set with the gear trains 119 and 120 for a given job and by simply operating the switch 150, either of the gear trains 119 or 120 becomes effective.

Although the various features of the improved angular turning attachment have been shown and described in detail to fully disclose two embodiments of the invention, it will be evident that numerous changes may be made in such details, and certain features may be used without others, without departing from the principles of the invention.

What is claimed is:

1. An angular turning attachment for a lathe having separate rotatable shafts for effecting the movement of its tool head along intersecting paths; a gear train between said shafts including a plurality of change-gears; clutches within said gear train adapted to effect a reversing drive to one of said shafts; a rotatable pointer and a non-rotatable dial indicator; and clutch-actuating means rendered effective when said pointer is turned to succeeding quadrants of said dial indicator alternately to effect the engagement of said clutches.

2. An angular turning attachment for a lathe having separate rotatable shafts for effecting the movement of its tool head along intersecting paths; a gear train between said shafts including a plurality of change-gears; a first clutch between one end of said gear train and one of said shafts; other clutches between the other end of said gear train and said other shaft, adapted to effect a reversing drive to said other shaft; a rotatable pointer and a non-rotatable dial indicator; and clutch-actuating means rendered effective when said pointer is turned to succeeding quadrants of said dial indicator to maintain said first clutch in engagement and alternatively to effect the engagement of said other clutches.

3. An angular turning attachment for a lathe having separate rotatable shafts for effecting the movement of its tool head along intersecting paths; a gear train between said shafts including a plurality of change-gears; electro-magnetic clutches within said gear train adapted to effect a reversing drive to one of said shafts; a rotatable pointer and a non-rotatable dial indicator; and switch-actuating means rendered effective when said pointer is turned to succeeding quadrants of said dial indicator alternatively to energize said electro-magnetic clutches.

4. An angular turning attachment for a lathe having separate rotatable shafts for effecting the movement of its tool head along intersecting paths; a gear train between said shafts including a plurality of change-gears; a first electro-magnetic clutch between one end of said gear train and one of said shafts; other electro-magnetic clutches between the other end of said gear train and said other shaft adapted to effect a reversing drive to said other shaft; a rotatable pointer and a non-rotatable dial indicator; and switch-actuating means rendered effective when said pointer is turned to succeeding quadrants of said dial indicator to maintain said first-electro-magnetic clutch energized, and alternatively to energize said other electro-magnetic clutches.

5. An angular turning attachment for a lathe having separate rotatable shafts for effecting the movement of its tool head along intersecting paths, and a feedworks for rotating said shafts at a plurality of different rates of speed in opposite directions and controlled by a directionally-sensitive operating lever, the combination with said feedworks, of a gear train between said shafts having a plurality of change-gears for establishing different gear ratios between said shafts, thereby to cause the tool head to be moved along a predetermined angular path when the directionally-sensitive operating lever is actuated; clutches within said gear train adapted to effect a reversing drive to one of said shafts; a rotatable pointer and a non-rotatable dial for indicating the predominating component of the selected angular path, to thereby indicate the direction in which the directionally-sensitive operating lever is to be moved; and clutch-actuating means rendered effective when said pointer is moved to succeeding quadrants alternatively to effect the engagement of said clutches.

6. An angular turning attachment for a lathe having separate rotatable shafts for effecting the movement of its tool head along intersecting paths, and a feedworks for rotating said shafts at a plurality of different rates of speed in opposite directions and controlled by a directionally-sensitive operating lever, the combination with said feedworks of a gear train between said shafts having a plurality of change-gears for establishing different gear ratios between said shafts, thereby to cause the tool head to move along a predetermined angular path when the directionally-sensitive operating lever is actuated; a first clutch between one end of said gear train and one of said shafts; other clutches between the other end of said gear train and said other shaft adapted to effect a reversing drive to said other shaft; and a rotatable pointer and a non-rotatable dial for indicating the predominating component of the selected angular path, thereby to indicate the direction in which the direction-sensitive operating lever is to be moved; and clutch-actuating means rendered effective when said pointer is turned to succeeding quadrants of said dial to maintain said first clutch engaged, and alternatively to effect the engagement of said other clutches.

7. An angular turning attachment for a lathe having separate rotatable shafts for effecting the movement of its tool head along intersecting paths, and a feedworks for rotating said shafts at a plurality of different rates of speed in opposite directions and controlled by a directionally-sensitive operating lever, the combination with said feedworks of a gear train between said shafts having a plurality of change-gears for establishing different gear ratios between said shafts, thereby to cause the tool head to move along a predetermined angular path when the directionally-sensitive operating lever is actuated; electro-magnetic clutches within said gear train adapted to effect a reversing drive to one of said shafts; a rotatable pointer and a non-rotatable dial for indicating the predominating component of the selected angular path to thereby indicate the direction in which the direction-sensitive operating lever is to be moved; and switch-actuating means rendered effective when said pointer is turned to succeeding quadrants of said dial, alternatively to energize said electro-magnetic clutches.

8. An angular turning attachment for a lathe having separate rotatable shafts for effecting the movement of its tool head along intersecting paths, and a feedworks for rotating said shafts at a plurality of different rates of speed in opposite directions and controlled by a directionally-sensitive operating lever, the combination with said feedworks of a gear train between said shafts having a plurality of change-gears for establishing different gear ratios between said shafts, thereby to cause the tool head to move along a predetermined angular path when the directionally-sensitive operating lever is actuated; a first electro-magnetic clutch between one end of said gear train and one of said shafts; other electro-magnetic clutches between the other end of said gear train and said other shaft adapted to effect a reversing drive to said other shaft; a rotatable pointer and a non-rotatable dial indicator for indicating the predominating component of the selected angular path to thereby indicate the direction in which the direction-sensitive operating lever is to be moved; and switch-actuating means rendered effective when said pointer is turned to succeeding quadrants of said dial to maintain said first electro-magnetic clutch energized, and alternatively to energize said other electro-magnetic clutches.

9. An angular turning attachment for a lathe having separate rotatable shafts for effecting the movement of its tool head along intersecting paths; separate gear trains between said shafts, each including a plurality of change-gears; common reversing means for driving both gear trains simultaneously in the same direction; a separate clutch connecting said common reversing means to each of said gear trains; separate rotatable dial pointers and non-rotatable indicators for each train of gears; and clutch-actuating means rendered effective when said pointers are turned to succeeding quadrants of their corresponding dial indicators alternatively to effect the engagement of said separate clutches.

10. An angular turning attachment for a lathe having separate rotatable shafts for effecting the movement of its tool head along intersecting paths; separate gear trains between said shafts, each including a plurality of change-gears; common reversing means for driving both gear trains simultaneously in the same direction including a clutch between one end of each gear train and one of said shafts; another clutch between the other end of each of said gear trains and said other shaft, adapted to effect a reversing drive to said other shaft; separate rotatable pointers and non-rotatable dial indicators, one for each of said gear trains; and clutch-actuating means rendered effectively when said pointers are turned to succeeding quadrants of their corresponding dial indicators to maintain its corresponding other clutch engaged, and alternatively to effect engagement of said first-mentioned clutches.

11. An angular turning attachment for a lathe having separate rotatable shafts for effecting the movement of its tool head along intersecting paths; separate gear trains between said shafts, each including a plurality of change-gears; common reversing means for driving both gear trains simultaneously in the same direction including a separate electro-magnetic clutch between one end of each gear train and one of said shafts; separate rotatable pointers and non-rotatable dial indicators for each train of gears; and separate switch-actuating means operated by said pointers when they are moved to succeeding quadrants of their corresponding dial indicators alternatively to energize said separate electro-magnetic clutches.

12. An angular turning attachment for a lathe having separate rotatable shafts for effecting the movement of its tool head along intersecting paths; separate gear trains between said shafts, each including a plurality of change-gears; common reversing means for driving both gear trains simultaneously in the same direction including a separate electro-magnetic clutch between one end of each of said gear trains and one of said shafts; another electro-magnetic clutch between the other end of each of said gear trains and said other shaft; a rotatable pointer and a non-rotatable dial indicator for each gear train; and separate switch-actuating means operated by said pointers when they are moved to succeeding quadrants of their corresponding dial indicators for maintaining their corresponding other electro-magnetic clutch energized, and alternatively energizing their coresponding first-mentioned electromagnetic clutches.

13. An angular turning attachment for a lathe having separate rotatable shafts for effecting the movement of its tool head along intersecting paths, and a feedworks for rotating said shafts at a plurality of different rates of speed in opposite directions and controlled by directionally-sensitive operating levers, the combination with said feedworks of separate gear trains between said shafts, each including a plurality of change-gears for establishing different gear ratios between said shafts to thereby cause the tool head to move along a predetermined angular path when the directionally-sensitive operating levers are actuated; common reversing means including clutches for driving both gear trains simultaneously in the same direction from one of said shafts; another clutch between the one end of each gear train and said other shaft; separate rotatable pointers and non-rotatable dial indicators for each gear train; and clutch-actuating means rendered effective when said pointers are turned to succeeding quadrants of their corresponding dial indicators alternatively to effect the engagement of the clutches of said reversing means.

14. An angular turning attachment for a lathe having separate shafts for effecting the movement of its tool head along intersecting paths, and a feedworks for rotating said shafts at a plurality of different rates of speed in opposite directions and controlled by directionally-sensitive operating levers, the combination with said feedworks of separate gear trains between said shafts, each including a plurality of change-gears for establishing different gear ratios between said shafts, to thereby cause the tool head to move along a predetermined angular path when the directionally-sensitive operating levers are actuated; a separate clutch between one end of each of said gear trains and one of said shafts; another clutch between the other end of each of said gear trains and said other shaft, adapted to effect a reversing drive to said other shaft; a rotatable pointer and a non-rotatable dial indicator for each of said gear trains; and clutch-actuating means rendered effective when said pointers are turned to succeeding quadrants of their corresponding dial indicators to effect the engagement of their corresponding first-mentioned clutch, and alternatively to effect the engagement of said other clutches.

15. An angular turning attachment for a lathe having separate rotatable shafts for effecting the movement of its tool head along intersecting paths, and a feedworks for rotating said shafts at a plurality of different rates of speed in opposite directions, and controlled by directionally-sensitive operating levers, the combination with said feedworks of separate gear trains between said shafts, each including a plurality of change-gears for establishing different gear ratios between said shafts to thereby cause the tool head to move along a predetermined angular path when the directionally-sensitive operating levers are actuated; common reversing means for driving both gear trains simultaneously in the same direction including a separate electro-magnetic clutch between one end of each of said gear trains and one of said shafts; another electro-magnetic clutch between the other end of each of said gear trains and said other shaft; a rotatable pointer and a non-rotatable dial indicator for each of said gear trains; and separate switch-actuating means operated by said pointers when they are moved to succeeding quadrants of their corresponding dial indicators to maintain their corresponding second-mentioned electromagnetic clutch energized, and alternatively to energize said other magnetic clutches.

16. An angular turning attachment for a lathe having separate rotatable shafts for effecting the movement of its tool head along intersecting paths, and a feedworks for rotating said shafts at a plurality of different rates of speed in opposite directions and controlled by directionally-sensitive operating levers, the combination with said feedworks of separate gear trains between said shafts, each including a plurality of change-gears for establishing different gear ratios between said shafts, to thereby cause the tool head to move along a predetermined angular path when the directionally-sensitive operating levers are actuated; common reversing means for driving both gear trains simultaneously in the same direction including an electro-magnetic clutch between the one end of each of said gear trains and said reversing means; and separate rotatable pointers and non-rotatable dial indicators for each gear train; and separate switch-actuating means operated by said pointers when they are moved to succeeding quadrants of their corresponding dial indicators alternatively to energize said separate magnetic clutches.

References Cited in the file of this patent

UNITED STATES PATENTS

| | | |
|---|---|---|
| 1,752,249 | Getz | Mar. 25, 1930 |
| 2,355,623 | Bullard | Aug. 15, 1944 |
| 2,725,767 | Addison | Dec. 6, 1955 |